US012644485B2

(12) United States Patent
Burr et al.

(10) Patent No.: US 12,644,485 B2
(45) Date of Patent: Jun. 2, 2026

(54) COMBINED SCREW AND RIVET

(71) Applicant: Snap-on Incorporated, Kenosha, WI (US)

(72) Inventors: Colten W. Burr, Kenosha, WI (US); Mark T. Gordon, Union Grove, WI (US); David T. Ross, Antioch, IL (US)

(73) Assignee: Snap-on Incorporated, Kenosha, WI (US)

( * ) Notice: Subject to any disclaimer, the term of this patent is extended or adjusted under 35 U.S.C. 154(b) by 470 days.

(21) Appl. No.: 16/984,547

(22) Filed: Aug. 4, 2020

(65) Prior Publication Data

US 2020/0362903 A1 Nov. 19, 2020

Related U.S. Application Data

(62) Division of application No. 15/978,419, filed on May 14, 2018.

(51) Int. Cl.
| | |
|---|---|
| *F16B 39/02* | (2006.01) |
| *B25B 13/46* | (2006.01) |
| *B25B 23/00* | (2006.01) |

(52) U.S. Cl.
CPC .......... *F16B 39/025* (2013.01); *B25B 13/462* (2013.01); *B25B 23/0007* (2013.01)

(58) Field of Classification Search
CPC . F16B 39/025; B25B 13/462; B25B 23/0007; B25B 13/463
USPC ........................................................ 411/325
See application file for complete search history.

(56) References Cited

U.S. PATENT DOCUMENTS

| | | | |
|---|---|---|---|
| 114,474 | A | 5/1871 | Randolph |
| 321,691 | A | 7/1885 | Comstock |
| 1,354,953 | A | 10/1920 | Carmer |
| 1,438,648 | A | 12/1922 | Jacobs |
| 1,978,935 | A | 10/1934 | Douglas |
| 1,995,610 | A | 3/1935 | Gray |
| 2,321,378 | A | 6/1943 | Green |
| 2,321,379 | A | 6/1943 | Green |
| 2,324,143 | A | 7/1943 | Erdman |
| 2,386,922 | A | 10/1945 | Andrews et al. |
| 2,637,361 | A | 5/1953 | Nagel |
| 2,678,585 | A | 5/1954 | Ellis |
| 2,760,400 | A * | 8/1956 | Mills ..................... F16B 43/001 411/371.1 |

(Continued)

FOREIGN PATENT DOCUMENTS

| | | |
|---|---|---|
| CN | 201103599 Y | 8/2008 |
| CN | 203548485 U | 4/2014 |

(Continued)

OTHER PUBLICATIONS

Chinese Office Action for corresponding Application No. 201910399481.0 dated Nov. 26, 2021, 5 pages.

(Continued)

*Primary Examiner* — Hadi Shakeri
(74) *Attorney, Agent, or Firm* — Taft, Stettinius & Hollister LLP

(57) ABSTRACT

Disclosed is a combination screw and rivet fastener that couples a cover plate to a ratchet head. The fastener is inserted into the ratchet head and then screwed into a hole of the cover plate. Thereafter, the tip of the fastener opposite the fastener head is deformed in a rivet operation.

2 Claims, 6 Drawing Sheets

(56) References Cited

U.S. PATENT DOCUMENTS

| | | | |
|---|---|---|---|
| 2,770,276 | A | 11/1956 | Broker |
| 3,145,750 | A | 8/1964 | Wootton |
| D200,217 | S | 2/1965 | Curtiss |
| 3,169,565 | A | 2/1965 | Surratt |
| 3,227,199 | A | 1/1966 | Mount |
| 3,245,096 | A | 4/1966 | McKay et al. |
| 3,358,726 | A | 12/1967 | Gabbey |
| 3,452,375 | A | 7/1969 | Gabbey |
| 3,542,106 | A | 11/1970 | Busch, Jr. |
| 3,578,367 | A | 5/1971 | Harvill |
| 3,728,750 | A | 4/1973 | Stillman et al. |
| 3,763,909 | A | 10/1973 | Stover, III |
| 3,785,420 | A | 1/1974 | Bradley et al. |
| 3,843,984 | A | 10/1974 | Bagheri et al. |
| 3,925,876 | A | 12/1975 | Curtis |
| 4,228,723 | A * | 10/1980 | Cunningham ...... F16B 23/0023 411/394 |
| 4,293,263 | A | 10/1981 | Zankl |
| 4,338,054 | A | 7/1982 | Dahl |
| 4,384,812 | A * | 5/1983 | Miyagawa .......... F16B 23/0076 81/436 |
| 4,411,570 | A | 10/1983 | Juric |
| 4,560,312 | A | 12/1985 | Grady |
| 4,701,993 | A | 10/1987 | Bradley et al. |
| 5,419,667 | A * | 5/1995 | Avgoustis ................ B21K 1/56 411/386 |
| 7,010,831 | B1 | 3/2006 | Beck et al. |
| 8,790,057 | B2 * | 7/2014 | Gisoldi ................... F16B 35/06 411/501 |
| 8,893,589 | B2 | 11/2014 | Kibby |
| 9,664,223 | B2 * | 5/2017 | Konagaya ............. F16B 35/047 |
| 2009/0145268 | A1 | 6/2009 | Laurie |
| 2011/0296959 | A1 | 12/2011 | Kibby |
| 2013/0118311 | A1 | 5/2013 | Bender et al. |
| 2015/0328749 | A1 | 11/2015 | Thompson et al. |
| 2017/0130757 | A1 | 5/2017 | Schneider et al. |

FOREIGN PATENT DOCUMENTS

| | | |
|---|---|---|
| CN | 106881677 A | 6/2017 |
| DE | 3512991 A1 | 10/1986 |
| EP | 0176968 A1 | 4/1986 |
| EP | 0494747 | 7/1992 |
| FR | 2511630 | 2/1983 |
| GB | 750894 | 9/1953 |
| GB | 2445470 | 9/2008 |
| GB | 2505901 A | 3/2014 |
| KR | 20160125149 A | 10/2016 |
| TW | M282784 | 12/2005 |
| TW | 201122246 | 7/2011 |
| WO | 2018070251 | 4/2018 |

OTHER PUBLICATIONS

Canadian Office Action for Application No. 3,026,373 dated Dec. 15, 2020, 4 pages.

Chinese Office Action for corresponding Chinese Application No. 201910399481.0 dated Jun. 2, 2021, 5 pages.

Combined Search and Examination Report for corresponding Application No. GB2109845.4 dated Aug. 9, 2021, 5 pages.

Canadian Office Action for corresponding Canadian Application No. 3,026,373 dated Jun. 22, 2021, 4 pages.

Examination Report No. 2 for corresponding Application No. 2020233631 dated Mar. 22, 2022, 3 pages.

Australian Examination Report No. 2 for Application No. 2018267239 dated Aug. 31, 2020, 4 pages.

Australian Examination Report No. 3 for Application No. 2018267239 dated Sep. 8, 2020, 6 pages.

Australian Examination Report No. 4 for Application No. 2018267239 dated Sep. 11, 2020, 4 pages.

United Kingdom Examination Report for Application No. GB1819038.9 dated Nov. 17, 2020, 3 pages.

Chinese Office Action for Application No. 201910399481.0 dated Oct. 12, 2020, 8 pages.

Taiwan Office Action for Application No. 10920922090 dated Sep. 25, 2020, 4 pages.

Search and Examination Report for Application No. GB1819038.9 dated Apr. 24, 2019, 7 pages.

Australian Examination Report No. 1 for Application No. 2018267239, dated Sep. 13, 2019, 7 pages.

Taiwan Office Action for Application No. 108116487, dated Nov. 26, 2019, 11 pages.

Canadian Office Action for Application No. 3,026,373, dated Dec. 11, 2019, 4 pages.

Examination Report for Application No. GB1819038.9 dated Mar. 3, 2021, 3 pages.

Examination Report No. 1 for Application No. 2020233631 dated Mar. 26, 2021, 6 pages.

Chinese Office Action for corresponding Application No. 201910399481.0 dated Jun. 28, 2022, 4 pages.

"Fastener Design Manual," Richard T. Barrett, NASA Reference Publication 1228, Mar. 1990, accessed on Apr. 18, 2023, 104 pages. URL: http://www.billavista.com/Tech/PDF_Index/files/Hardware%20and%20Fasteners/NASA%20Fastener%20Design&20Manual%201990.pdf.

"How do rivets work?," Dr. Jody Meulaner, Michelle Froese, Fastener Engineering, Nov. 21, 2019, accessed on Apr. 18, 2023, 5 pages. URL: https://fastenerengineering.com/how-do-rivets-work/.

* cited by examiner

COMBINED SCREW AND RIVET

CROSS REFERENCES TO RELATED APPLICATIONS

This application is a divisional of, and claims priority to, U.S. patent application Ser. No. 15/978,419, filed May 14, 2018, the contents of which are incorporated herein by reference in their entirety.

TECHNICAL FIELD OF THE INVENTION

The present invention relates generally to fasteners. More particularly, the present invention relates to a combined screw and rivet to be used with, for example, a ratchet wrench cover plate.

BACKGROUND OF THE INVENTION

Ratchet wrenches are commonly used to fasten fasteners to base materials or to other hardware such as a nut. Ratchet wrenches allow a user to rotate a wrench handle in a first rotational direction to apply torque, and to then rotate the wrench handle in a second rotational direction to return the wrench handle to its original position without applying reverse torque to the work piece. The process can then be repeated until the requisite amount of torque is applied to the work piece.

Ratchet wrenches and other tools typically include cover plates. In the ratchet wrench context, the cover plate encloses a ratchet head housing that includes ratchet components inside, for example, the ratchet gear. The cover plate is typically fastened to the ratchet head housing by a screw, as shown in, for example, FIGS. 5 and 6. As shown, a screw 500 can connect a ratchet head 505 to a cover plate 510. The screw 500 is typically inserted into an opening 515 in the ratchet head 505 and then screwed into a hole 520 in the cover plate 510. In doing so, the screw 500 connects the cover plate 510 to the ratchet head 505, but is susceptible to loosening or falling out, creating debris and opening the ratchet head 505.

SUMMARY OF THE INVENTION

The present invention broadly comprise a combination screw and rivet fastener that couples a cover plate to a ratchet head. The fastener is first inserted into a clearance hole that may be void of threads, and the fastener is then screwed into an opening in a cover plate until the fastener head is substantially flush against the ratchet head. The tip of the fastener opposite the fastener head is then deformed in a riveting operation to more securely couple the cover plate to the ratchet head.

For example, in an embodiment, the present invention broadly comprises a ratchet wrench including a ratchet head having a clearance hole extending therethrough, a cover plate coupled to the ratchet head and enclosing contents within the ratchet head, the cover plate including an opening, and a fastener having a fastener head located at a first end, a tip located at a second end opposite the first end, a shaft extending between the fastener head and the tip, and threads disposed around the shaft. The fastener is coupled to the cover plate at the threads and the tip is deformed in a riveting operation.

Further disclosed is a method of assembling a ratchet wrench including providing a fastener having a fastener head located at a first end, a tip located at a second end opposite the first end, a shaft extending between the fastener head and the tip, and threads disposed around the shaft, inserting the fastener through a clearance hole of a ratchet head, coupling the fastener to an opening of a cover plate by screwing the fastener into the opening at the threads, and performing a riveting operation at the tip to secure the fastener to the cover plate and ratchet head.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE EMBODIMENTS

Figure 1:
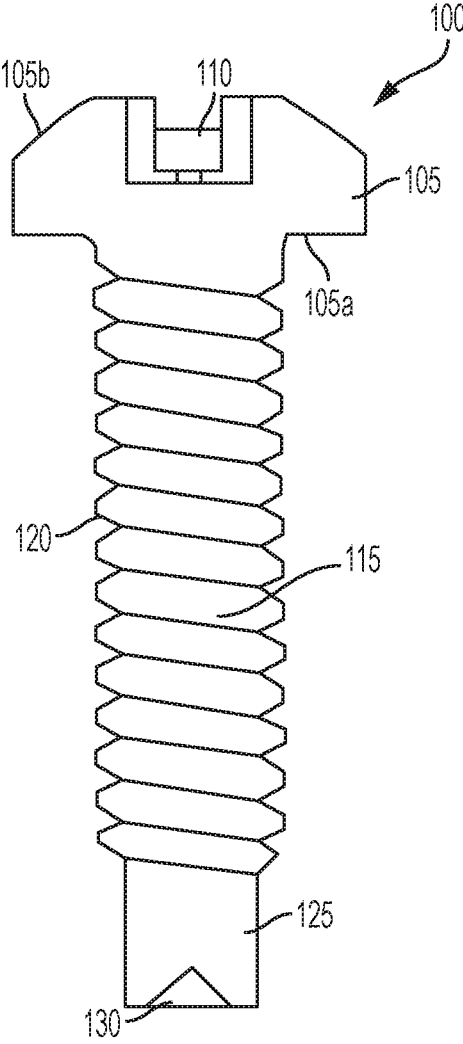
FIG. 1 is a side view of a fastener according to at least some of the presently disclosed embodiments.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention broadly comprises a combination screw and rivet fastener. In another embodiment, the present invention broadly comprises a method of securing a cover plate to a ratchet head using a combination screw and rivet fastener. The fastener can be inserted into the ratchet head and then screwed into an opening in a cover plate until the fastener head is substantially flush against the ratchet head surface. A riveting operation can then be performed on the tip of the fastener opposite the fastener head to more securely couple the cover plate to the ratchet head.

Referring to FIG. 1, a fastener 100 is shown with a fastener head 105 having a top side 105b and a bottom side 105a opposite the top side 105b. The fastener head 105 also includes a slot 110 located on the top side 105b for receiving a screwdriver or other tool so that the fastener 100 can be rotated and coupled to a cover plate, as described below in more detail. A shaft 115 can extend from the fastener head 105 and include threads 120. A tip 125 can extend from the shaft 115 at an end of the fastener 100 opposite the fastener head 105. A dimple 130 can be located on the end of the tip 125 to allow easier deformation of the tip 125 in a riveting operation, as described below in more detail.

As shown, the fastener head 105 can be a rounded screw head with a slot 110 for a slotted screwdriver. However, the present invention is not so limited and the fastener head 105 can instead be any shape or size, for example, a flat, oval, round, pan, button, hex, truss, hex washer, or fillister head, for example. The slot 110 is also not limited to a conventional slot and can instead be a Phillips head, straight slot, combination Phillips head and straight slot, hexagonal opening, or any other shape or size slot that allows a tool to grip the slot and rotate the fastener 100.

The shaft 115 acts as the structural backbone of the fastener and can be any size or shape that provides such structural support. The threads 120 on the shaft 115 can likewise be any type of threads, for example right-hand or left-hand threads, without departing from the spirit and scope of the present invention.

The tip 125 and dimple 130 are provided on an end of the fastener 100 opposite the fastener head 105. The tip 125 and dimple 130 are structured and manufactured to allow for a deformation in the tip 125 in a riveting operation, and the tip 125 and dimple 130 can therefore be any size or shape, and the fastener 100 can be any material, that allows such an operation.

Figure 2:
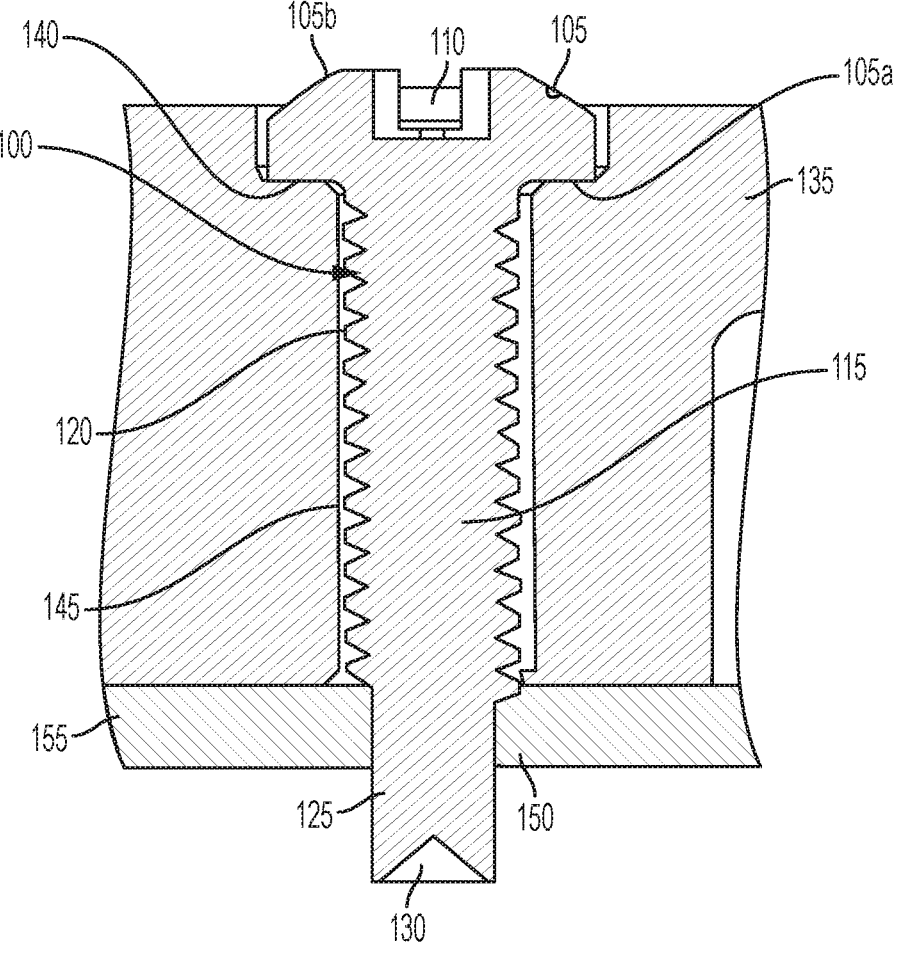
FIG. 2 is a side sectional view of a fastener located in a ratchet head and coupled to a cover plate with the tip of the fastener in the undeformed position according to at least some of the presently disclosed embodiments.
Figure 3:
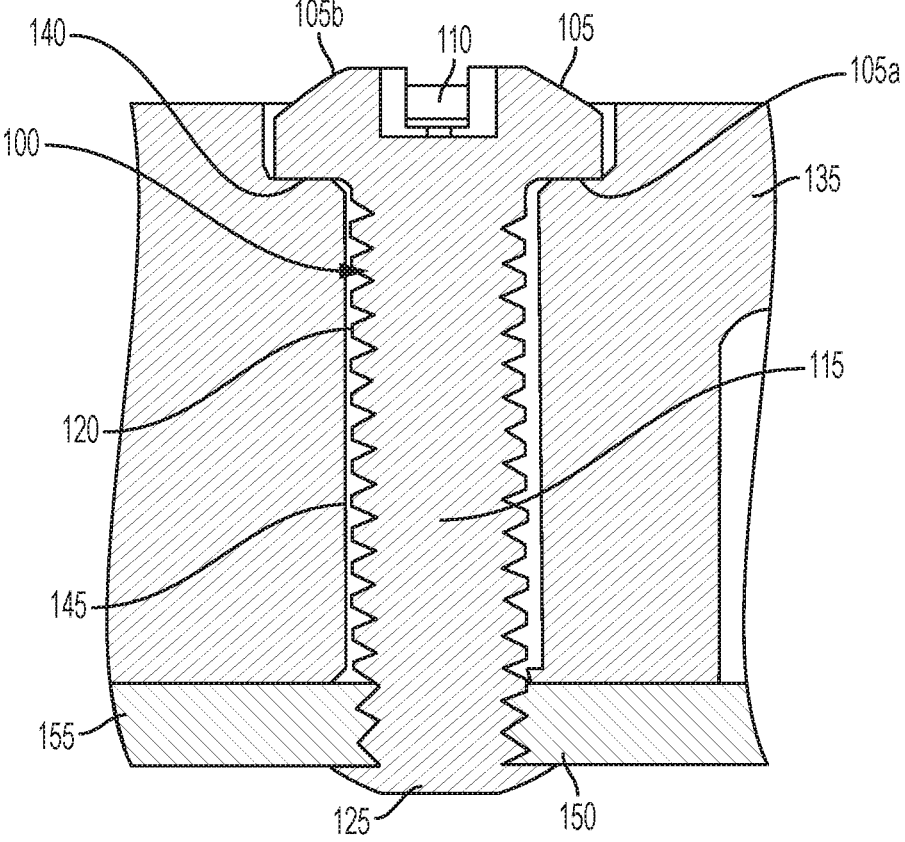
FIG. 3 is a side sectional view of a fastener located in a ratchet head and coupled to a cover plate with the tip of the fastener in the deformed position according to at least some of the presently disclosed embodiments.

Referring to FIGS. 2 and 3, the fastener 100 can first be inserted into a ratchet head 135 of a ratchet wrench by placing the fastener 100 in a counterbore 140 of the ratchet head 135. The shaft 115 can then extend through a clearance hole 145 in the ratchet head 135 and screw into an opening 150 on a cover plate 155, as shown. For example, and without limitation, the fastener 100 can be inserted through the clearance hole 145 until the bottom side 105a of the fastener head 105 abuts the bottom surface of the counterbore 140 or, if there is no counterbore 140, a top surface of the ratchet head 135. More generally, in some embodiments, the fastener 100 can be inserted until the fastener head 105 is flush with the surface upon which it rests.

Once the fastener 100 is inserted into the ratchet head 135, the threads 120 of the fastener 100 can then be screwed into the cover plate 155. Here, the threads 120 can be screwed into the opening 150 of the cover plate until, for example, the fastener head 105 is flush with the surface upon which it rests, as shown in FIG. 2. Thereafter, the tip 125 of the fastener 100 can be deformed, for example the tip 125 can be axially and radially deformed in a riveting operation, thereby causing the tip 125 to widen circumferentially to form a mushroomed type head, as shown in FIG. 3. As well known, a riveting operation results in permanent deformation of the tip, in which the deformation is irreversible (i.e., the tip cannot readily be returned to its original shape after the riveting operation is performed). Therefore, as well known, a riveting operation results in a permanent connection of two items.

Figure 4:
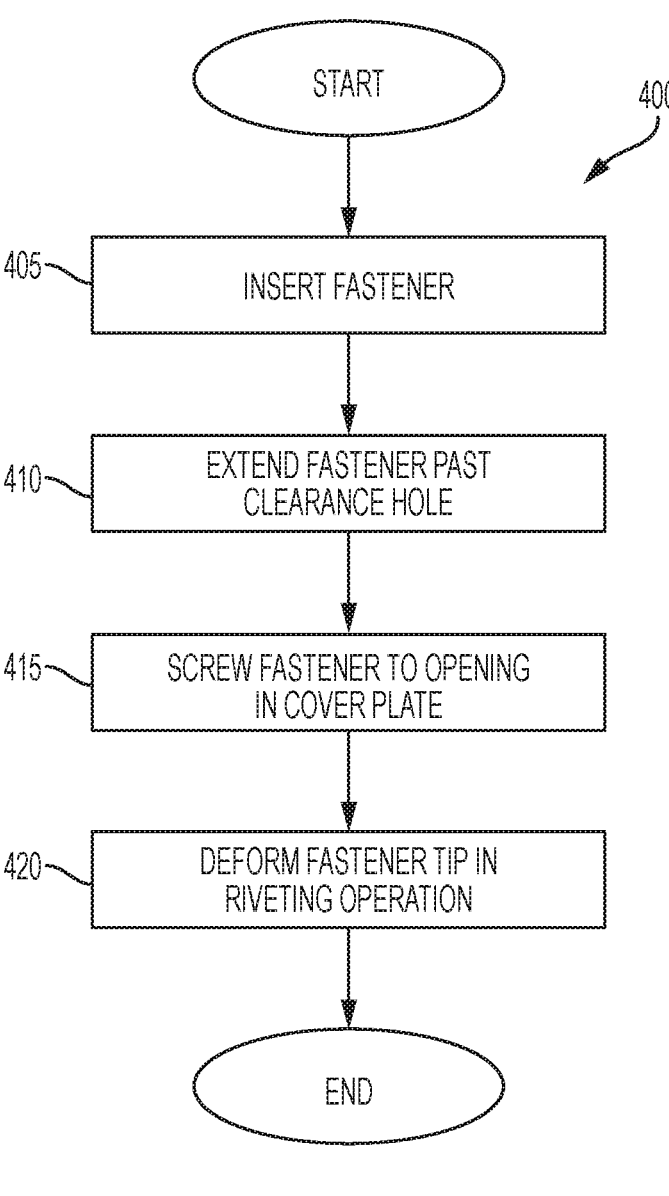
FIG. 4 is a flow chart illustrating a method of assembling a ratchet head according to at least some of the presently disclosed embodiments.
Figure 5:
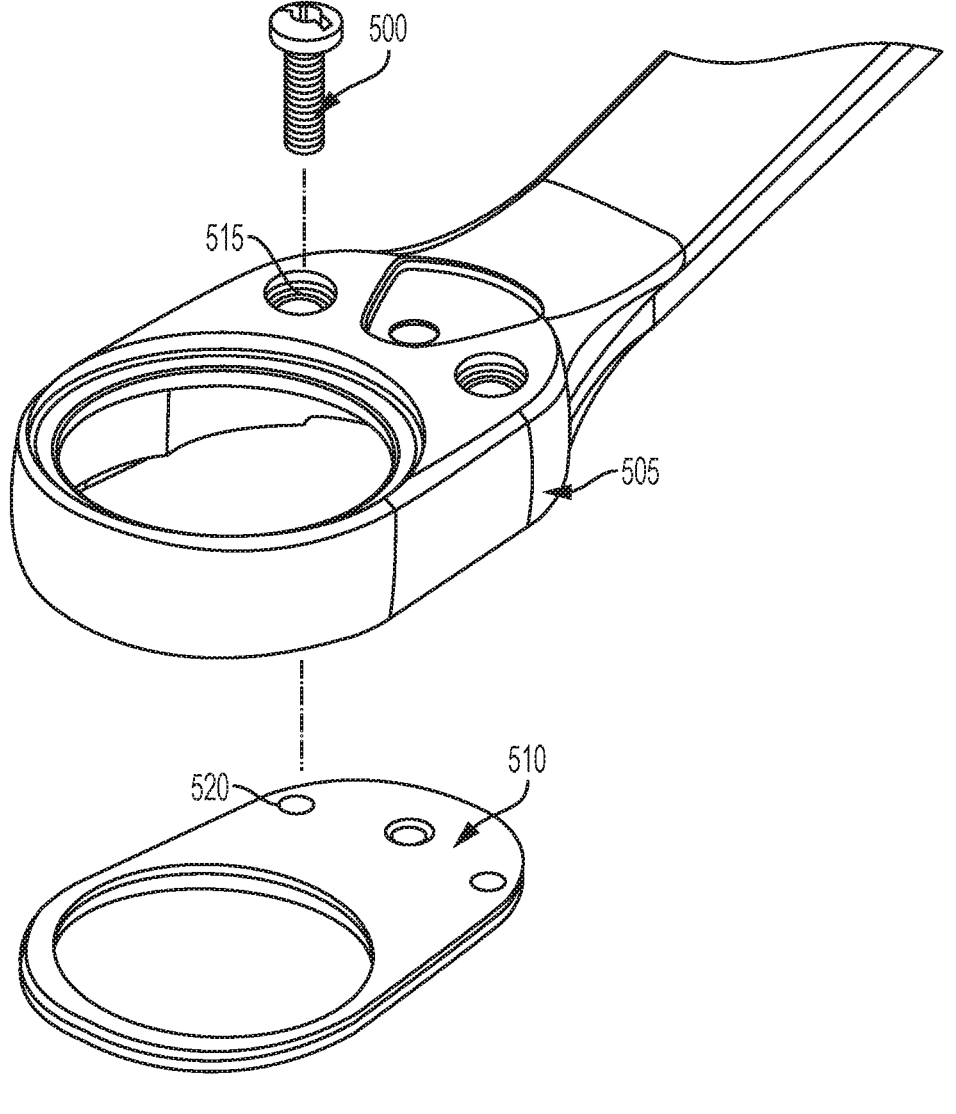
FIG. 5 is an exploded view of a prior art fastener, ratchet head, and cover plate combination.
Figure 6:
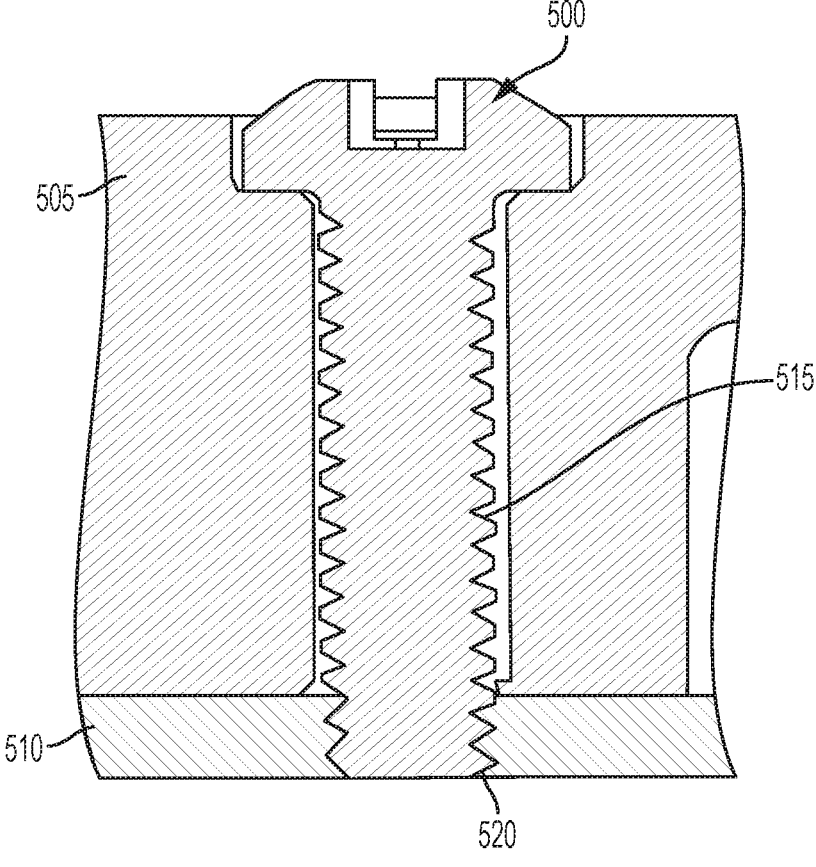
FIG. 6 is a side sectional view of the prior art fastener, ratchet head, and cover plate combination illustrated in FIG. 5.

FIG. 4 is a flow chart illustrating a method of assembling a ratchet wrench according to at least some of the presently disclosed embodiments. As shown, the process 400 begins and proceeds to step 405, where the fastener 100 is inserted into the ratchet head 105. The fastener 100 is then extended past the clearance hole 145 in step 410, and screwed to an opening 150 in the cover plate 155 in step 415. A riveting operation is then performed in step 420 to deform the fastener 100, for example the tip 125 thereof, and secure the fastener 100 against the ratchet head 105 as shown in FIG. 3. The process 400 then ends.

As discussed herein, the fastener 100 can be implemented in a ratchet wrench within a ratchet head 105, but the present invention is not so limited. For example, the fastener 100 can also be implemented in any other tool or any other application other than a tool.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:
1. A fastener adapted to rivet at least two components together, the fastener comprising:
a shaft having opposing first and second ends;
threads surrounding the shaft at least partially between the first and second ends;
a fastener head disposed proximate to the first end; and
a non-threaded tip disposed proximate to the second end, wherein the non-threaded tip includes a dimple adapted to control a location of axial and radial deformation of the non-threaded tip caused by a riveting operation, wherein the riveting operation causes the non-threaded tip to permanently deform radially to widen circumferentially at the location to form a mushroomed head to cause the fastener to rivet the at least two components together.
2. The fastener of claim 1, wherein the fastener head includes a slot adapted to receive a tool and further adapted to be rotated by the tool.

* * * * *